United States Patent [19]
Huggett et al.

[11] Patent Number: 5,142,439
[45] Date of Patent: Aug. 25, 1992

[54] INTEGRATED BUS BAR/MULTILAYER CERAMIC CAPACITOR MODULE

[75] Inventors: Colin E. Huggett, Torrance; Leon D. Lewis, Rancho Palos Verdes; Robert Rudich, San Pedro; John L. Scharf, Rancho Palos Verdes, all of Calif.; Daniel C. Blazej, Annandale, N.J.

[73] Assignee: Allied-Signal Inc., Morris Township, Morris County, N.J.

[21] Appl. No.: 751,455

[22] Filed: Aug. 28, 1991

[51] Int. Cl.⁵ .......................... H01G 4/10; H01B 7/00
[52] U.S. Cl. ................................. 361/321; 174/72 B
[58] Field of Search .............. 174/72 B; 361/306, 321, 361/328, 329, 330, 398, 407

[56] References Cited

U.S. PATENT DOCUMENTS

| | | | |
|---|---|---|---|
| 4,399,321 | 8/1983 | Gottlieb | 174/72 B |
| 4,403,108 | 9/1983 | DeVries | 174/72 B |
| 4,430,522 | 2/1984 | Bader | 174/72 B |
| 4,436,953 | 3/1984 | Gottlieb | 174/72 B |
| 4,440,972 | 4/1984 | Taylor | 174/72 B |
| 4,517,406 | 5/1985 | Erdle | 174/72 B |
| 4,599,486 | 7/1986 | Hernandez | 174/72 B |
| 5,051,542 | 9/1991 | Hernandez | 174/72 B |

Primary Examiner—Donald A. Griffin
Attorney, Agent, or Firm—Howard G. Massung; Robert A. Walsh

[57] ABSTRACT

A high-voltage, low-volume capacitor module, having a minimal amount of inherent stray inductance, and being configured so as to allow its integration into an electrical system in a manner which minimizes any stray inductance introduced by interconnection wiring. This is accomplished by integrating the capacitor into the bus bars of the voltage convertor, thereby eliminating the need for separate interconnecting wiring and reducing the overall amount of stray inductance evident within the system in which the capacitor is employed.

7 Claims, 7 Drawing Sheets

INTEGRATED BUS BAR/MULTILAYER CERAMIC CAPACITOR MODULE

BACKGROUND OF THE INVENTION

The present invention provides for a high-voltage, low-volume ceramic capacitor module. More particularly, this invention relates to a high-voltage ceramic capacitor fabricated using surface-mount chip capacitor technology, and capable of being integrated into various electrical systems in a manner which would minimize the amount stray inductance (also denoted as "$L_{Stray}$") introduced into the system.

Electrical power conversion (from AC to DC, DC to AC, or DC to DC) is increasingly being accomplished by solid-state devices (IGBTs, MCTs, FETs, BITs, etc.) in conjunction with capacitors, inductors and resistors. Many examples of power circuit topology that can be used to accomplish this power conversion may be found in the prior art. A typical example of such circuitry for converting direct current electrical power to alternating current electrical power is shown in FIG. 1A. In FIG. 1A, an inverter, comprised of power switching devices 1, 2, 3 and 4, is gated so that an alternating voltage is produced across the circuit's output. A typical gating sequence to produce such a voltage would be to sequentially switch between a state where devices 1 and 4 were "on" (conductive) while devices 2 and 3 were "off" (non-conductive), and a state where devices 1 and 4 were "off", and devices 2 and 3 were "on". Similar topologies are used in DC-to-DC converters, DC-to-multiphase AC converters, and AC to DC converters.

One of the primary problems encountered in designing and producing such power converters is the minimization of so-called stray inductances. These are the inductances introduced by capacitors employed within the converters, the cabling typically used to connect these capacitors to the positive and negative power supply terminals, and by the power switching devices which are employed within these converters. The inductances introduced by these sources all contribute to the magnitude of the total stray inductance for the converter, and can be modeled as a lumped stray inductance (see FIG. 1B).

A certain amount of such stray inductance will be present in all power converters, simply as a result of unavoidable physical constraints upon the capacitor size, lead lengths, and interconnect wiring between the power switching devices and the capacitors. This stray inductance, while typically only several microhenrys in magnitude, is nonetheless significant in its impact upon converter performance.

Typically, in such voltage converters, the output switching devices are opened and closed at high frequencies, and each time the switching devices are opened the energy stored in the stray inductance (which is equal to $\frac{1}{2}I^2 L_{Stray}$ joules) must be dissipated. At multiple kilohertz switching frequencies, the amount of power to be dissipated becomes appreciable. Furthermore, at such high frequency switching rates, the act of dissipating this energy causes high-voltage stresses to be imposed upon the switching devices, and thereby reduces the power handling capability of the overall converter.

SUMMARY OF THE INVENTION

Accordingly, it is the object of the present invention to provide for a high-voltage, low-volume capacitor module, having a minimal amount of inherent stray inductance, and being configured so as to allow its integration into an electrical system in a manner which minimizes any stray inductance introduced by interconnection wiring. This is accomplished by integrating the capacitor into the bus bars of the voltage convertor, thereby eliminating the need for separate interconnecting wiring and reducing the overall amount of stray inductance evident within the system in which the capacitor is employed.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which.

DETAILED DESCRIPTION OF THE INVENTION

This invention provides a high-voltage, low-volume ceramic capacitor module, fabricated using surface-mount chip capacitor technology, and capable of being integrated into various electrical systems in a manner which would minimize stray inductance.

Figure 2:
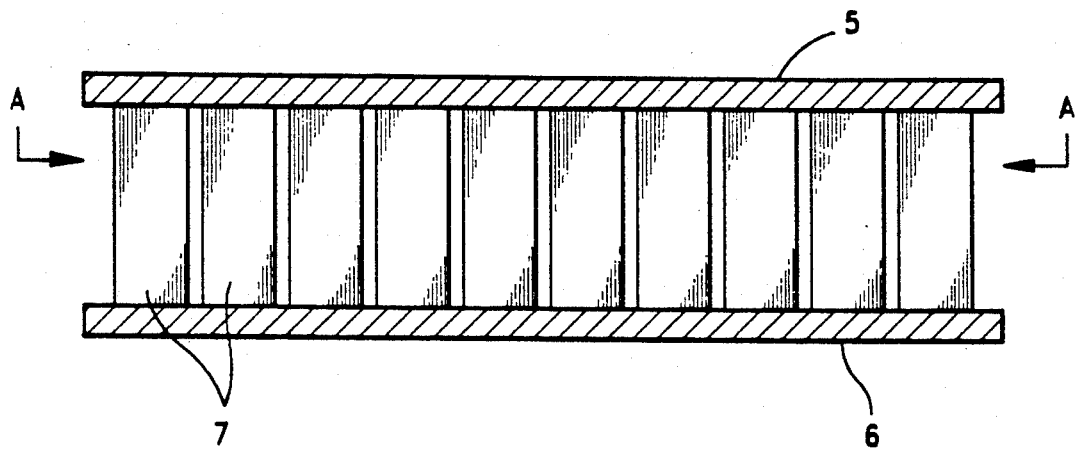
FIG. 2 is a side view of a preferred embodiment of the high-voltage capacitor.
Figure 3:
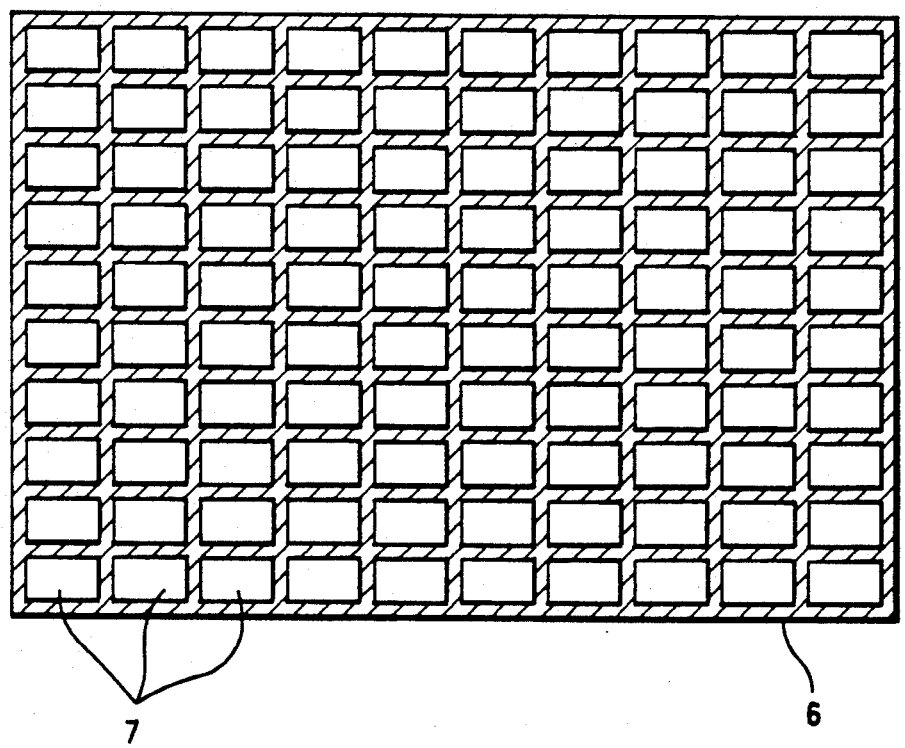
FIG. 3 is a top, cross-sectional view of the high-voltage capacitor of FIG. 2, along the line A—A of that figure.

As shown in FIGS. 2 and 3, a preferred embodiment of the high-voltage capacitor module consists of upper 5 and a lower 6 contact plates, between which a plurality of individual multilayer ceramic ("MLC") chip capacitors 7 are affixed. The contact plates are typically fabricated from copper, although other conductive materials could be substituted. The MLC capacitors sandwiched between the plates are preferably fashioned from a Barium Titanate ceramic. Multilayer capacitors fabricated from this particular ceramic have a high capacitance to volume ratio, exhibit excellent temperature stability, introduce minimal electrical losses (even at high frequencies), and are suitable for use in high-voltage applications. One such MLC capacitor is commonly designated as an X7R type chip, and is available from several manufacturers including Olean Advanced Products of Olean, N.Y.

The individual chip capacitors are affixed to the contact plates via solder joints. The MLC chip capacitor is uniquely suited to the fabrication of the capacitor module as the opposite ends of an MLC chip are metalized, forming the terminals of the capacitor, and it is these metalized end surfaces that are soldered to the contact plates of the module. The utilization of the metalized ends of the capacitor for both mechanical mounting and electrical termination yields the very low inductance and the low equivalent series resistance that characterizes the overall module assembly. All of the capacitor chips may be simultaneously soldered to a given contact plate using Vapor Phase Reflow solder techniques. The use of reflow soldering adds to the overall ease of fabrication offered by the configuration of the instant invention.

Figure 1A:
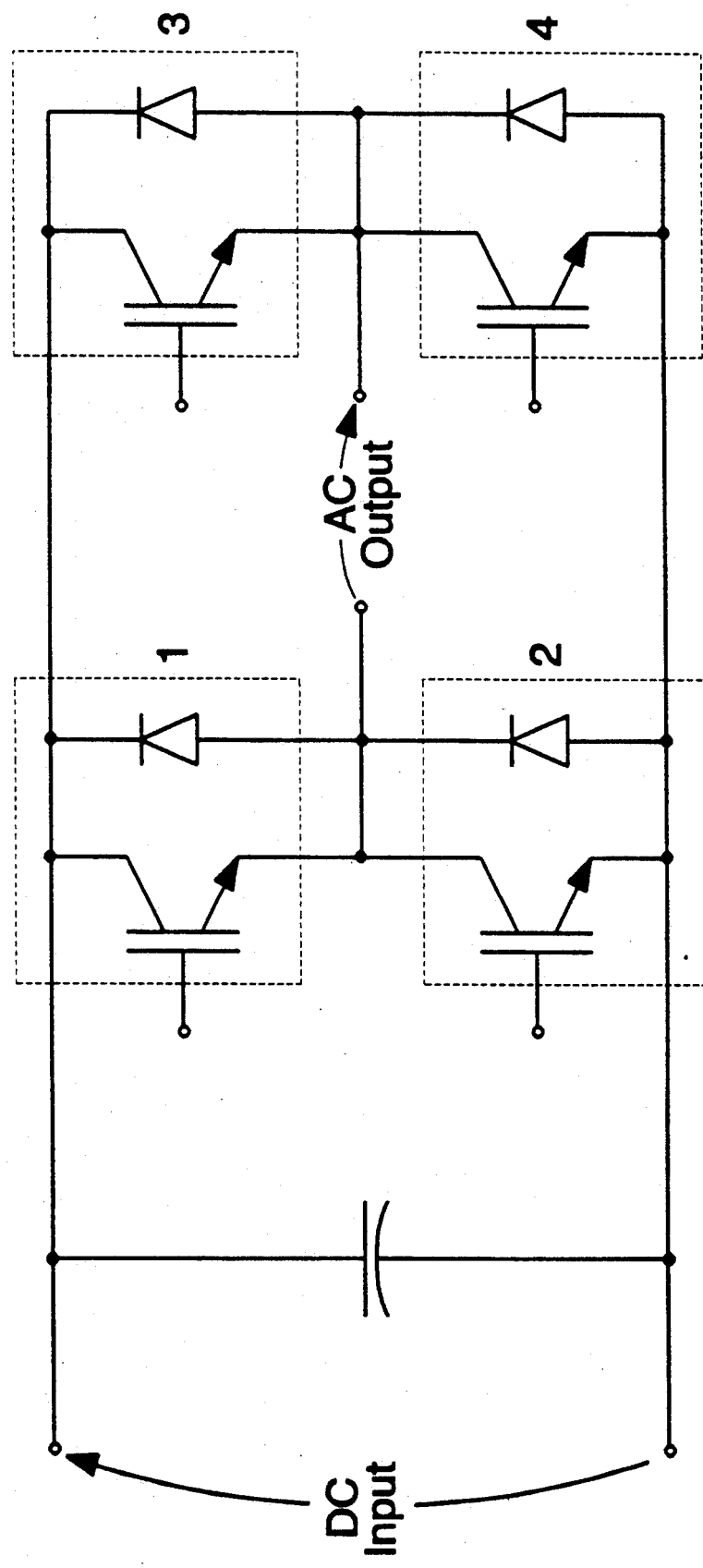
FIG. 1A is a schematic diagram showing a typical voltage inverter topology employed for converting a DC voltage to an AC voltage.
Figure 1B:
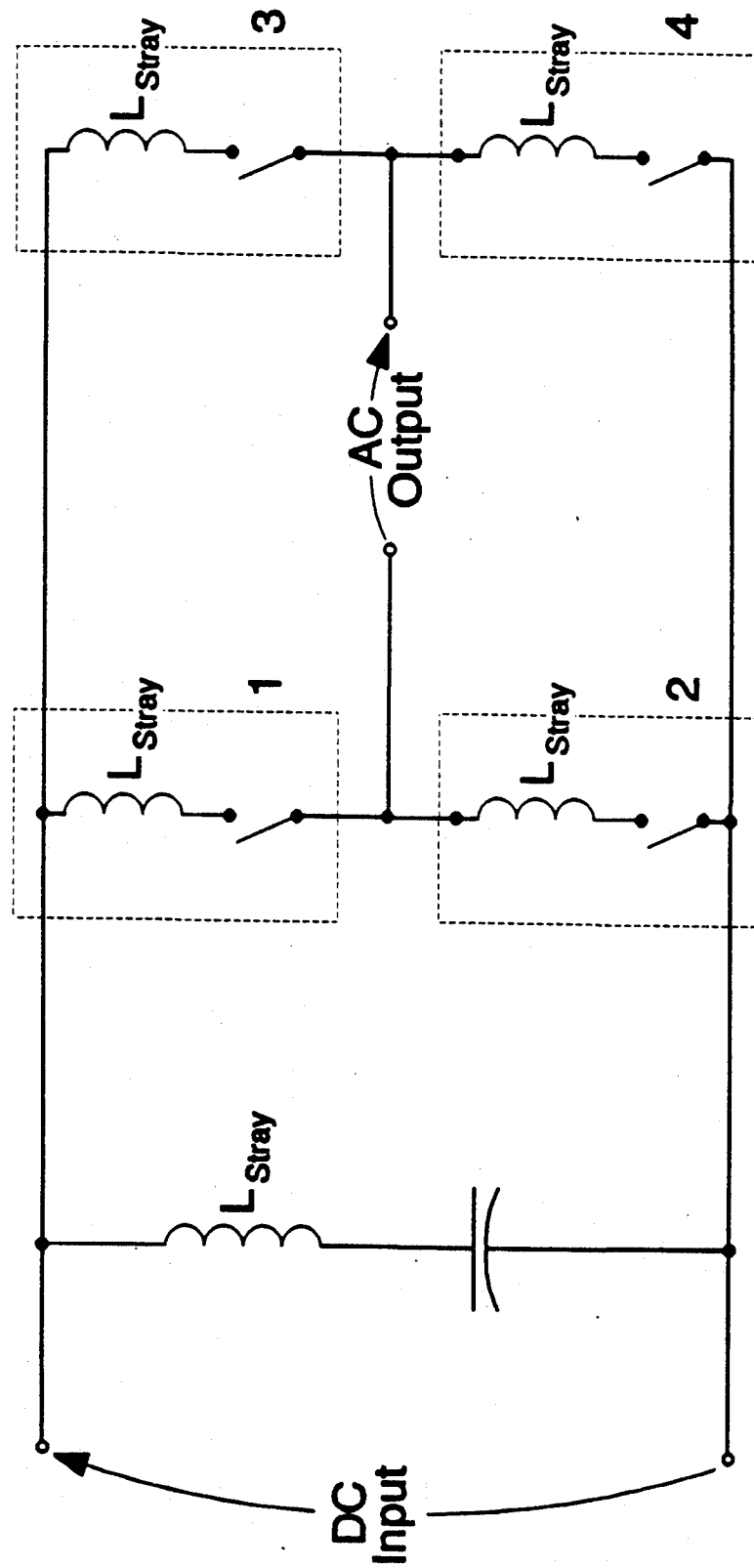
FIG. 1B is a schematic diagram of a circuit equivalent to that shown in FIG. 1, wherein stray inductances are represented as discrete inductors.

In operation, the upper and lower contact plates are employed as the power supply bus bars which feed the various electrical components of the system in which the capacitor is employed. In the case of the capacitor being employed in a power converter such as that illustrated in FIG. 1, the bus bars would feed the switching devices. This eliminates the need for connecting cables inbetween the capacitor and the switching devices, and thereby removes one source of stray inductance from the power converter.

Figure 4:
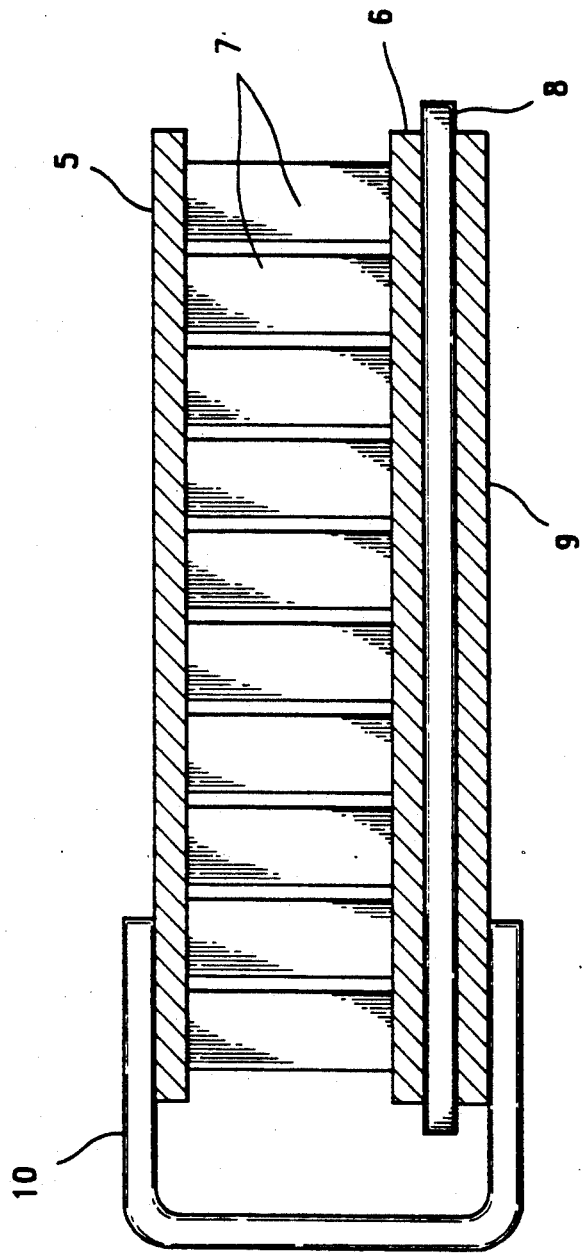
FIG. 4 is a side view of an additional preferred embodiment of the high-voltage capacitor.
Figure 5A:
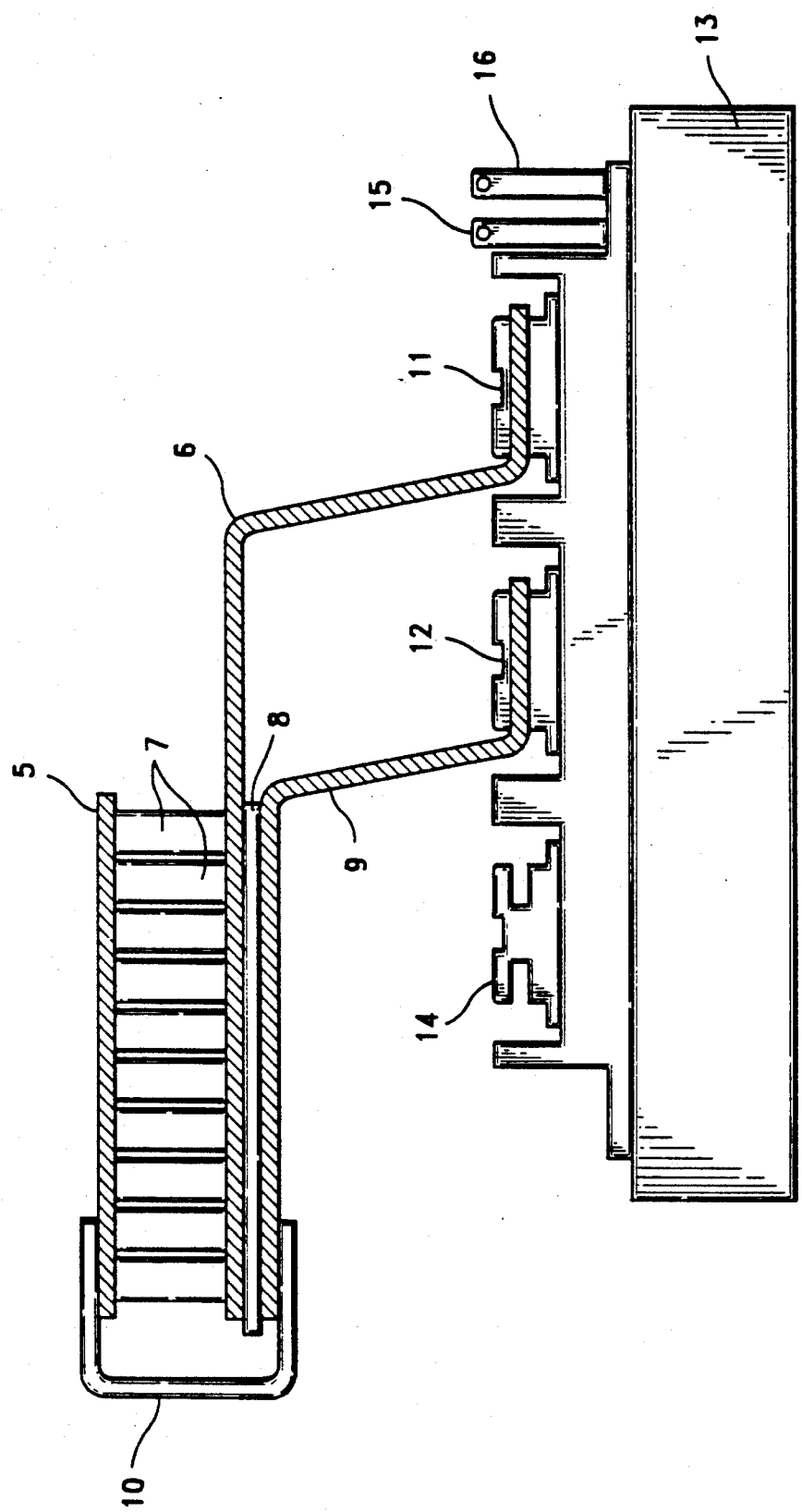
FIG. 5A is a side view of the high-voltage capacitor of FIG. 4 interconnected to a solid-state power switching device.
Figure 5B:
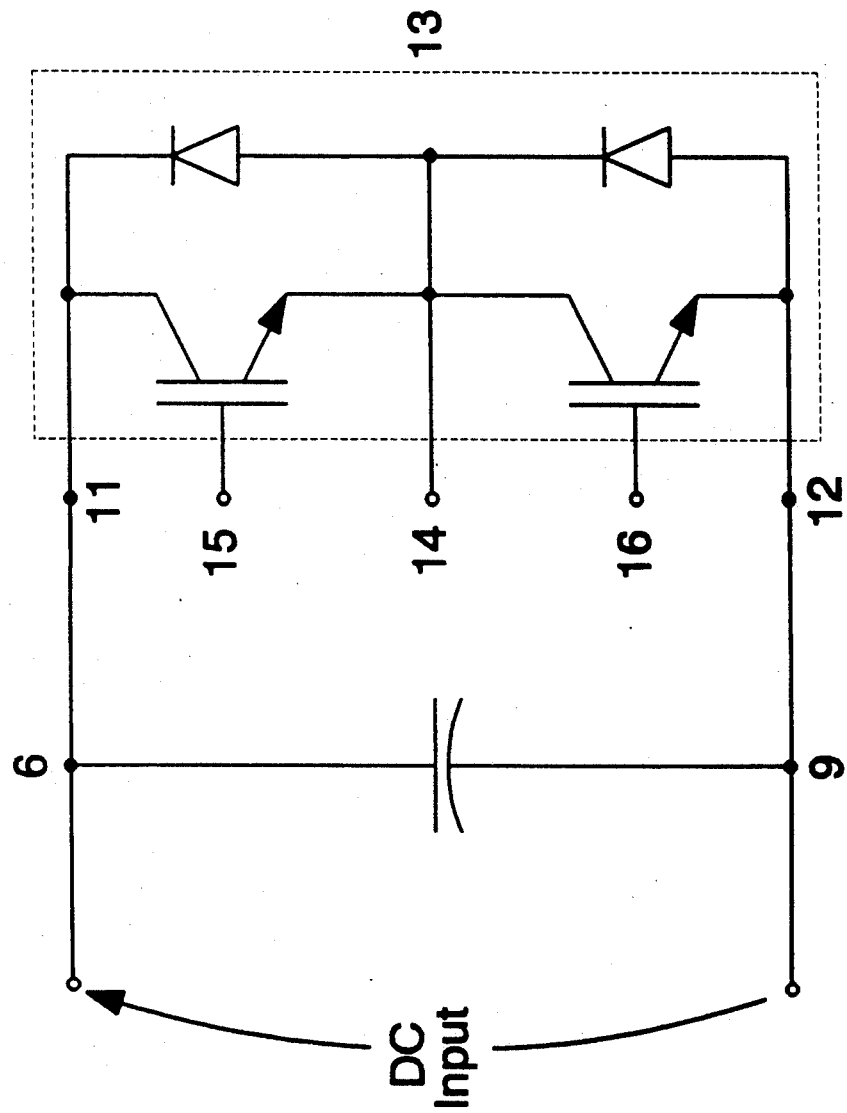
FIG. 5B is a schematic diagram of the high-voltage capacitor/solid-state switching device arrangement of FIG. 5A.

An additional preferred embodiment of the invention is shown in FIG. 4. In this embodiment, an upper 5 and a lower 6 contact plates sandwich a plurality of individual MLC chip capacitors 7. As with the previously described embodiment, the contact plates are fabricated from copper or other suitable conductive material, the chip capacitors are fabricated from Barium Titanate (or a similar ceramic), and the individual chips are soldered to each of the plates. A planar insulator 8 is affixed to the exposed face of the lower contact plate, and a third conductive plate 9 is affixed to the exposed face of the planar insulator. A bridging conductor 10 is conductively attached to the upper contact plate and the third conductive plate. This reconfiguration of the contacts allows for convenient extension of the contacts and facilitates their employment as bus lines within an electrical system. FIG. 5A shows such an embodiment having an extended lower contact plate 6 and an extended third conductive plate 9, which have been attached, respectively, to the collector 11 and emitter 12 terminals of an integrated pair of power switching devices 13. FIG. 5B is a schematic of the arrangement pictured in FIG. 5A. As both FIG. 5A and FIG. 5B are intended to provide an illustration of capacitor integration, rather than depict a complete operable power conversion circuit, the common collector/emitter terminal 14, and both base contacts 15, 16 of the integrated power switching device are shown as being left open.

Figure 6:
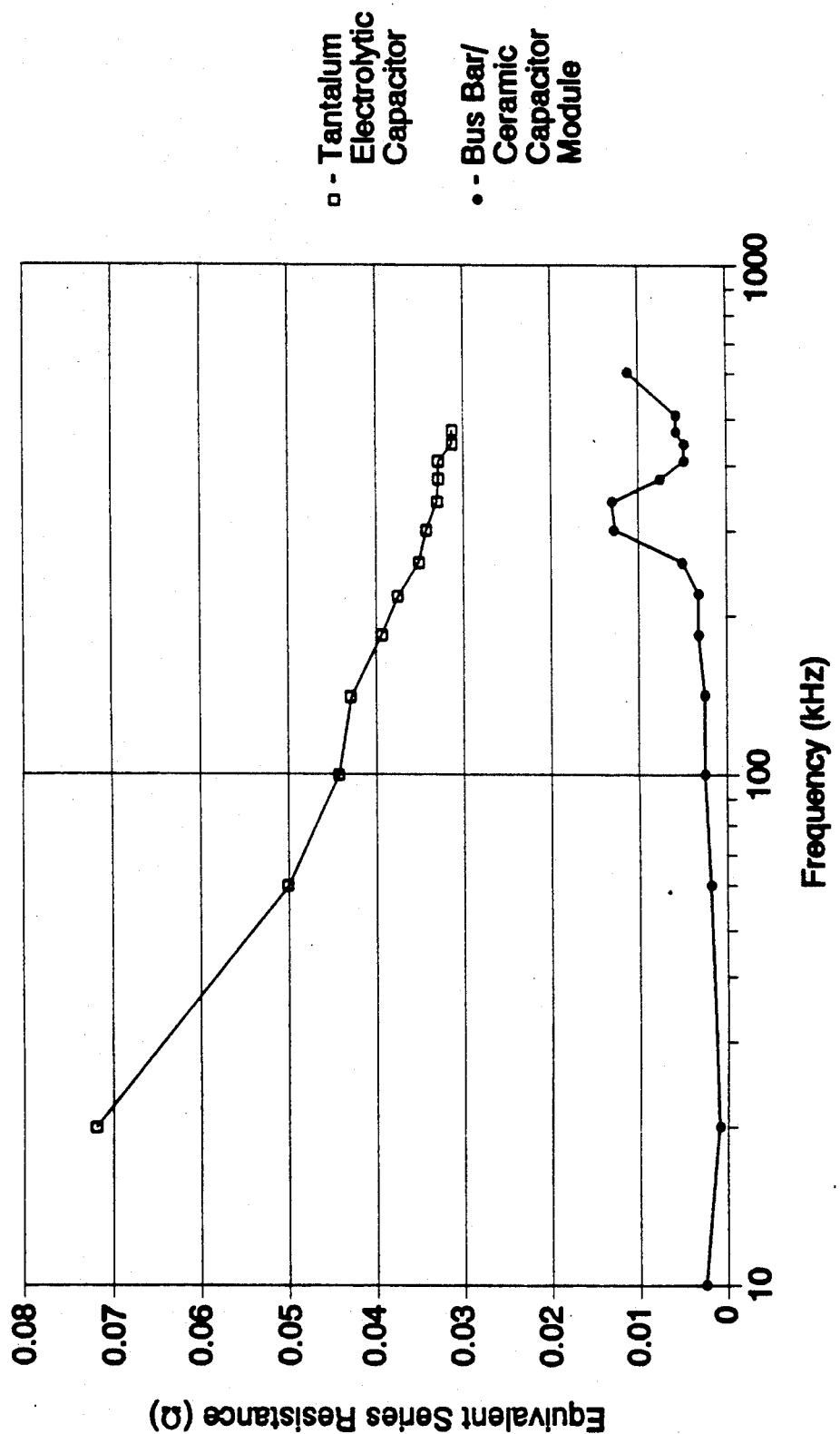
FIG. 6 is a graph showing equivalent series resistance as a function of operating frequency for both a prior art tantalum capacitor and ceramic high-voltage capacitor having a configuration similar to that of the capacitors illustrated in FIGS. 2 and 4.

A graphical illustration of the improved electrical performance offered by a multilayer ceramic bus bar/capacitor module, such as those disclosed above, is illustrated in FIG. 6. The equivalent series resistance for a prior art tantalum electrolytic capacitor is many times greater than that presented by a the bus bar/ceramic capacitor module. This reduced equivalent series resistance results in considerably less heat being generated from ripple current passing through the module. The benefits of this reduced heating include enhanced device reliability and a reduction in the amount of cooling required for the overall system in which the module is employed.

It will be understood that the particular embodiments described above are only illustrative of the principles of the present invention, and that various modifications could be made by those skilled in the art without departing from the scope and spirit of the present invention, which is limited only by the claims that follow.

What is claimed is:

1. A capacitor comprising:
   a first conductive electrode;
   a second conductive electrode;
   capacitor means conductively attached between the first conductive electrode and the second conductive electrode;
   a third conductive electrode;
   means for electrically isolating the third conductive electrode from the second conductive electrode; and
   conductive means electrically connecting the first conductive electrode to the third conductive electrode.

2. A capacitor as described by claim 1, wherein the means for electrically isolating the third conductive electrode from the second conductive electrode includes:
   insulating means attached to the second conductive electrode; and
   the third conductive electrode attached to the insulating means.

3. A capacitor as described by claim 1, wherein the capacitor means includes:
   a plurality of multilayer ceramic chip capacitors.

4. A capacitor comprising:
   a first conductive electrode having an upper and a lower surface;
   a second conductive electrode having an upper and a lower surface, and configured for use as a power conducting bus bar within an electrical circuit;
   a plurality of multilayer ceramic chip capacitors conductively attached between the lower surface of the first conductive electrode and the upper surface of the second conductive electrode;
   an insulating means affixed to the lower surface of the second conductive electrode;
   a third conductive electrode configured for use as a power conducting bus bar within an electrical circuit, and attached to the insulating means so that said third conductive electrode is electrically isolated for the second conductive electrode; and
   a conductive means electrically connecting the first conductive electrode to the third conductive electrode.

5. A capacitor comprising:
   a first conductive electrode;
   a second conductive electrode;
   a plurality of barium titanate multilayer ceramic chip capacitors conductively attached between the first conductive electrode and the second conductive electrode;
   a third conductive electrode;
   means for electrically isolating the third conductive electrode from the second conductive electrode; and
   conductive means electrically connecting the first conductive electrode to the third conductive electrode.

6. A capacitor as described by claim 5, wherein the means for electrically isolating the third conductive electrode from the second conductive electrode includes:

insulating means attached to the second conductive electrode; and the third conductive electrode attached to the insulating means.

7. A capacitor comprising:

a first conductive electrode having an upper and a lower surface;

a second conductive electrode having an upper and a lower surface, and configured for use as a power conducting bus bar within an electrical circuit;

a plurality of barium titanate multilayer ceramic chip capacitors conductively attached between the lower surface of the first conductive electrode and the upper surface of the second conductive electrode;

an insulating means affixed to the lower surface of the second conductive electrode;

a third conductive electrode configured for use as a power conducting bus bar within an electrical circuit, and attached to the insulating means so that said third conductive electrode is electrically isolated from the second conductive electrode; and a conductive means electrically connecting the first conductive electrode to the third conductive electrode.

* * * * *